Feb. 10, 1942.   A. HARGRAVES   2,272,879
TIRE TREAD CONSTRUCTION
Filed Nov. 20, 1937   2 Sheets-Sheet 1
FIG. 1.
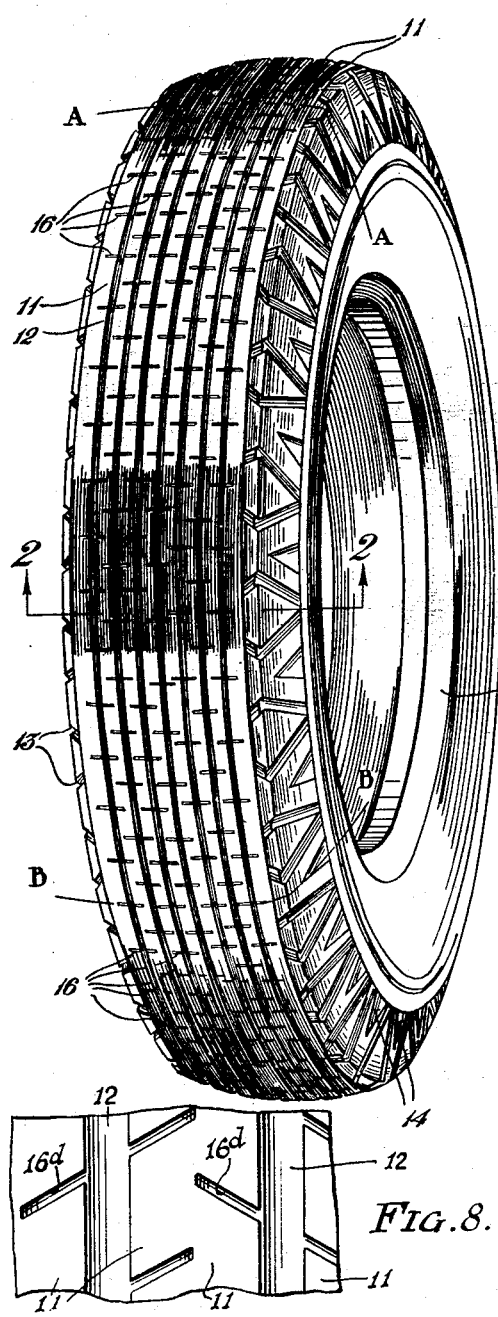
FIG. 2.
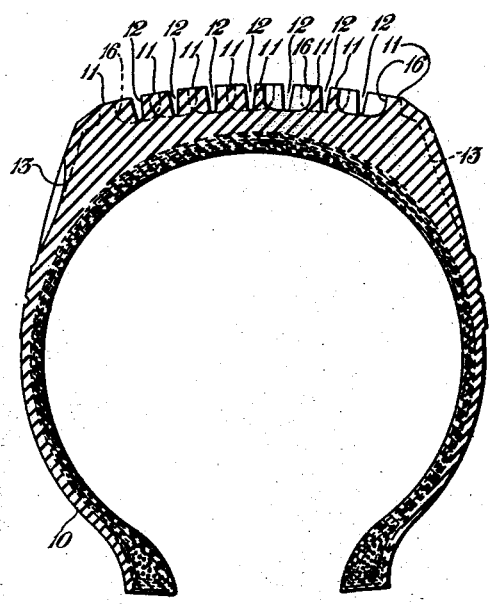
FIG. 4.
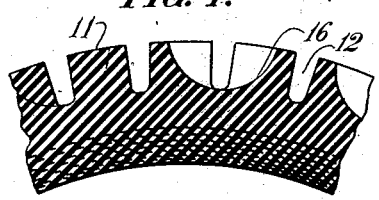
FIG. 5.
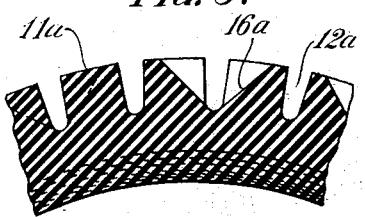
FIG. 8.
Inventor
Albert Hargraves
Albert L. Ely
Attorney Patented Feb. 10, 1942

2,272,879

UNITED STATES PATENT OFFICE 2,272,879

TIRE TREAD CONSTRUCTION

Albert Hargraves, Silver Lake, Ohio, assignor to The Firestone Tire & Rubber Company, Akron, Ohio, a corporation of Ohio Application November 20, 1937, Serial No. 275,669
In Great Britain January 5, 1937

11 Claims. (Cl. 152—209)

This invention relates to tires for vehicle wheels, and more especially it relates to the construction of the tread portions of resilient vehicle tires.

The chief objects of the invention are to provide an improved tire tread that is substantially as noiseless as a tread composed of circumferentially extending ribs; that will have greater skid resistance than said circumferential rib construction, especially in oblique and in fore and aft directions. A further object of the invention is to provide an improved tire, the road-contacting or tread surface of which is so formed as to give efficient road-holding properties under all conditions of service and also improved wearing properties. More specifically the invention comprises an improved tire tread consisting of circumferential ribs that are partially transversely incised, slotted or cut through by circumferentially spaced narrow slits or slots extending a substantial distance, but not wholly, thereacross. Other objects will be manifest as the specification proceeds.

Of the accompanying drawings:

Figure 1 is a perspective view of a pneumatic tire casing embodying the invention, in its preferred form;

Figure 2 is a section on the line 2—2 of Figure 1;

Figure 3 is a developed plan view of the tread of the tire, on a larger scale, in the region between the lines A—A and B—B of Figure 1;

Figure 4 is an enlarged detail of the section shown in Figure 2;

Figure 8 is an enlarged plan view of a further modification of the invention showing the slots arranged obliquely in the ribs.

Figure 5:
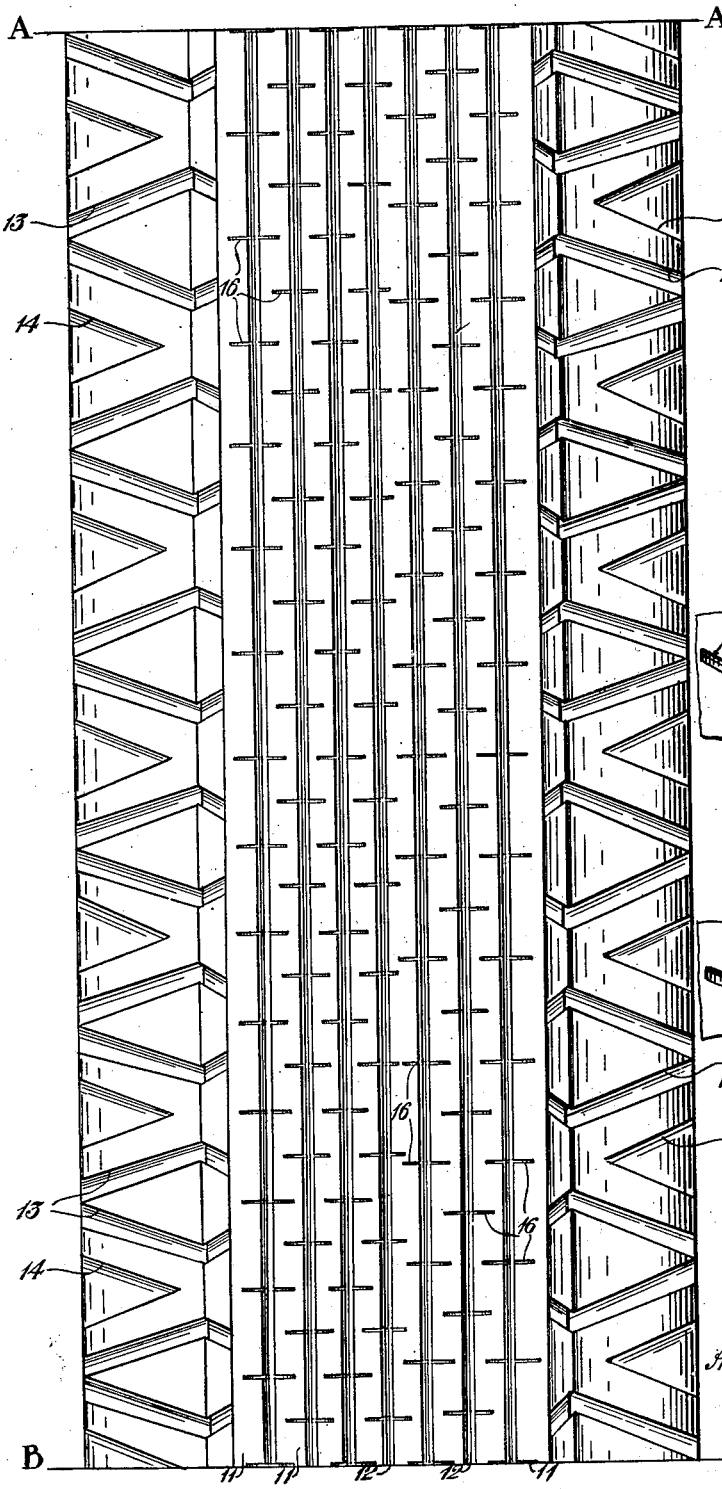
Figure 5 is a similar enlarged detail of a section illustrating another embodiment of the invention.

Referring to the drawings, 10 is a pneumatic tire casing of the usual cord fabric body and rubber tread construction, said tread portion comprising a plurality of endless, parallel, circumferentially extending ribs 11, 11 that are separated by intervening grooves 12, 12. As shown, the ribs 11 are eight in number, although the number of ribs may vary in tires of different widths. Preferably, however, there is an even number of ribs so that there is a groove 12 along the medial line of the tread. The outermost ribs 11 of the tread are buttressed by respective rubber structures extending to the sidewalls of the tire, and said structures may be formed with suitable grooves 13 and recesses 14 that are so arranged as to form a distinctive and characteristic design.

A novel structural feature of the tread is the multiplicity of circumferentially spaced transverse grooves or slots 16, 16 formed in the ribs 11 of the tire. The slots 16 are relatively narrow, for example from ½ millimeter to 1 millimeter in width, and the circumferential distance between the successive slots in any rib is much greater than the width of a slot, being conveniently at least about twenty times the width of a slot and preferably not less than 10 millimeters. The slots may be formed in the tire by sawing or cutting, but preferably are molded therein while the tire is being vulcanized. The bottom of one side of each slot 16 is preferably flush with the bottom of a groove 12 of the tire, the bottom surface of each slot being rounded, and the length of each slot being such that it extends preferably more than half way through the ribs 11 at each side of said groove 12. As is more clearly shown in Figure 4 of the drawings, the configuration of slots 16 is such as to leave an uncut portion of rib 11 which has a relatively wide base and which tapers to a minimum width at the periphery of the tire tread.

To afford more silent running than can be obtained when the slots are uniformly spaced throughout the tire tread circumference, the circumferential spacing of the slots may be varied in any suitable manner; for example, the slots 16 that traverse a groove 12 are in staggered relation to the slots that traverse an adjacent groove 12, and the outermost ribs 11, at opposite sides of the tread, are slotted only from the side thereof that is contiguous with a groove 12. The arrangement is such that the ribs 11 intermediate the said outermost ribs are formed with slots that are disposed transversely thereof, and extend from opposite lateral margins thereof in alternation.

Although the number of the slots 16 and the narrow width thereof is such that they create but little noise while the tire is in use, an asymmetrical arrangement of the slots on opposite sides of the medial plane of the tire is provided for the purpose of preventing resonance of such road noises as may develop. Said asymmetrical arrangement is complete in units, each of which extends exactly one-fourth the circumference of the tire, a representative unit extending from line A—A to B—B of Figure 1 and being illustrated on a larger scale in Figure 3. As is most clearly shown in the latter figure, the slots 16 on the right hand side of the tread in the lower half thereof are more widely spaced apart than are the slots on the left hand side of the tread. The arrangement is reversed in the upper half of the figure, the wider spacing being on the left hand side of the tread, with the result that the number of slots on each side of the tread, between lines A—A and B—B, is exactly equal. By reason of the asymmetrical arrangement described, the slots 16 are in transverse alignment with each other completely across the tire only at widely spaced intervals, and this arrangement, in combination with the relatively narrow width of the slots and large number thereof, results in a tire that is substantially noiseless in operation. The particular asymmetrical arrangement of the slots 16 is not original with this invention, and no claim to the arrangement per se is made herein.

Because of the presence of the slots 16 in the ribs 11, the latter are provided with a plurality of transverse road-gripping edges and are more flexible and thereby deform more readily so as more effectively to resist oblique and fore and aft skidding. Since the grooves 16 do not extend entirely across the ribs, a continuous or unbroken bearing surface is afforded and the ribs are not cut into individual blocks which might tilt or otherwise move relatively of each other in service. Hence flexing of the ribs does not result in such wear or wiping as occurs when the ribs are composed of adjacent individual blocks or lugs. The slots 16 are sufficiently narrow that they do not pick up stones or gravel.

In the modified form of the invention illustrated in Figure 5, the tire tread is similarly formed with circumferential ribs 11ª separated by circumferentially extending grooves 12ª. Slots 16ª are circumferentially spaced about the tire in the manner of slots 16 in the foregoing embodiment of the invention, but are provided with a beveled bottom surface extending at an angle to the peripheral surface of the tire tread.

In either form of the invention, the unbroken portion of ribs 11 or 11ª is formed with a relatively wide base portion and tapers to a relatively narrow portion at the tread surface. This configuration affords greater stability of the rib adjacent the slotted area to prevent undue flexing or wiping at this portion of the tread, as well as to provide a tread having transverse slots therein until the ribs are worn down to the level of the bottom of the grooves.

Figure 6:
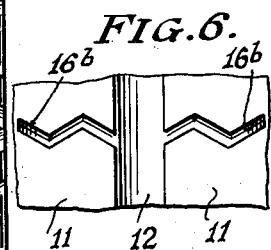
Figure 6 is an enlarged plan view of modification of the invention showing curved slots.
Figure 7:
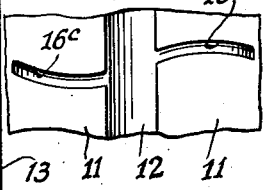
Figure 7 is an enlarged plan view of a further modification of the invention showing slots of zig-zag shape.

In Figures 6 and 7 modified forms of the invention are shown in which the slots are, respectively, curved and of zig-zag shape but extend, in general, transversely of the ribs. In Figure 8 a further modified form of the invention is shown in which straight slots extend obliquely in the ribs. It is to be understood, of course, that the curved zig-zag or oblique slots may have the bottoms thereof curved or inclined as respectively shown in Figures 4 and 5.

The tire is quiet in operation and affords a longer wearing tread which is more resistant to lateral and angular skidding, and which provides greater tractive qualities. Each embodiment achieves the other advantages set out in the foregoing statement of objects.

Modification may be resorted to without departing from the spirit of the invention, or the scope thereof as defined by the appended claims.

What is claimed is:

1. A resilient tire comprising a tread portion formed with a circumferentially extending rib, the latter having relatively narrow transverse slots therein that extend partly across its structure, said slots being of such narrow width that the edges thereof will be distorted into contact with each other upon the application of tangential or lateral stress, the bottom of said slots being formed in such a manner that the remainder of the rib at the inner end of each slot has a wide base portion and gradually tapers to a relatively narrow portion at the periphery of the tire tread.

2. A combination as defined in claim 1 in which the bottom of each slot is formed with a curved surface.

3. A combination as defined in claim 1 in which the bottom of each slot is formed with a beveled surface, inclined with respect to the peripheral surface of the tire tread.

4. A resilient tire having a tread portion provided with a plurality of ribs separated by annular grooves, at least one of said ribs having a plurality of circumferentially spaced transverse slots of constant width extending inwardly from the margins of said ribs and only part way across the body of said ribs, said slots being relatively narrow as compared to the width of said grooves, the width of said slots also being relatively small in proportion to the depth of said grooves, and the depth of said slots varying in inverse relation to the distance of the cross-section through the slot from the lateral margin of said ribs.

5. A resilient tire having a tread portion provided with a plurality of ribs separated by annular grooves, all of said ribs having a plurality of circumferentially spaced transverse slots of constant width extending inwardly from the margins of the respective ribs and only part way across the body of said ribs, said slots being relatively narrow as compared to the width of said grooves, the width of said slots also being relatively small in proportion to the depth of said grooves, and the depth of said slots varying in inverse relation to the distance of the cross-section through the slot from the lateral margin of said ribs.

6. A resilient tire having a tread comprising a continuous circumferential rib having the lateral margins thereof physically interrupted at circumferentially spaced intervals from the lateral extremities thereof inwardly of, but only partially across, the body of said ribs, said physical interruptions being of such size that when the tire is deflected under free rolling conditions the ribs are functionally and mechanically uninterrupted, the depth of said physical interruptions varying in inverse relation to the distance of the cross-section through said physical interruptions from the lateral extremities of said ribs.

7. A resilient tire tread particularly for pneumatic tires, comprising a circumferentially extending, functionally continuous traction rib which is substantially less in width than one-half the width of the tread, said rib having a plurality of circumferentially spaced slots of substantially constant width extending inwardly from the lateral margins of said rib and only part way across said rib, the height of said rib and the mean width of said rib being such that said rib will be capable of deforming to permit said slots to open up to increase the traction of the tread when the tread is subjected to traction forces, the circumferential continuity of said rib serving to place the loaded part of the rib under compression in a circumferential direction when such part of the rib is deformed under load to compress the faces of the slots into abutting relation under free rolling conditions.

8. A resilient tire tread, particularly for pneumatic tires, said tread comprising a plurality of continuous, circumferentially extending ribs which are laterally flexible and which are substantially less in width than one-half the width of said tread, at least some of said ribs having a plurality of circumferentially spaced slots of substantially constant width extending inwardly from the margins of said ribs and only part way across said ribs, said slots being relatively narrow as compared to the distance between the slots.

9. A resilient tire tread, particularly for pneumatic tires, said tread comprising a plurality of continuous, circumferentially extending ribs which are laterally flexible and which are substantially less in width than one-half the width of said tread, at least some of said ribs having a plurality of circumferentially spaced slots of substantially constant width extending inwardly from the margins of said ribs and only part way across said ribs, said slots being of the order of ½ to 1 millimeter in width, and being spaced by a distance of approximately twenty times the width of said slots.

10. A resilient tire tread, particularly for pneumatic tires, said tread comprising a plurality of continuous, circumferentially extending ribs which are laterally flexible and which are substantially less in width than one-quarter the width of said tread, all of the laterally inner of said ribs having a plurality of circumferentially spaced slots of substantially constant width extending inwardly from both margins of said ribs and only part way across said ribs, said ribs at the laterally outer portion of the tread having similar slots formed on their laterally inner surfaces, said slots being relatively narrow as compared to the circumferential distance between the slots.

11. A resilient tire tread, particularly for pneumatic tires, said tread comprising a plurality of continuous, circumferentially extending ribs which are laterally flexible and which are substantially less in width than one-quarter the width of said tread, at least a majority of said ribs having a plurality of circumferentially spaced slots of substantially constant width extending inwardly from both margins of said ribs and only part way across said ribs, said slots being relatively narrow as compared to the circumferential distance between the slots.

ALBERT HARGRAVES.

CERTIFICATE OF CORRECTION.

Patent No. 2,272,879.                                February 10, 1942.

ALBERT HARGRAVES.

It is hereby certified that error appears in the above numbered patent requiring correction as follows: In the heading to the printed specification, line 6 thereof, for the serial number "275,669" read --175,669--; and that the said Letters Patent should be read with this correction therein that the same may conform to the record of the case in the Patent Office.

Signed and sealed this 21st day of April, A. D. 1942.

(Seal)
Henry Van Arsdale,
Acting Commissioner of Patents.